United States Patent
Followell et al.

(10) Patent No.: US 9,784,638 B1
(45) Date of Patent: Oct. 10, 2017

(54) METHOD AND SYSTEM FOR DIAGNOSES AND PROGNOSES OF LOW TEMPERATURE LIMIT CONTROL VALVE

(71) Applicant: THE BOEING COMPANY, Chicago, IL (US)

(72) Inventors: David Allan Followell, Wildwood, MO (US); Eric Lee Nicks, Defiance, MO (US); Nail Hanov, Hazelwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 219 days.

(21) Appl. No.: 14/841,219

(22) Filed: Aug. 31, 2015

(51) Int. Cl.
| G01M 3/28 | (2006.01) |
| F25B 49/00 | (2006.01) |
| B64D 13/06 | (2006.01) |

(52) U.S. Cl.
CPC ........... G01M 3/2876 (2013.01); B64D 13/06 (2013.01); F25B 49/00 (2013.01); F25B 2600/25 (2013.01)

(58) Field of Classification Search
CPC ... G01M 3/2876; F25B 2600/25; F25B 49/00; B64D 13/08; B64D 13/06; G06N 5/04; G05B 23/0235
See application file for complete search history.

(56) References Cited

U.S. PATENT DOCUMENTS

| 5,967,461 | A  | * | 10/1999 | Farrington | ............. | B64D 13/06 |
|           |    |   |         |            |               | 244/118.5 |
| 6,491,254 | B1 | * | 12/2002 | Walkinshaw | ............ | A62C 3/08 |
|           |    |   |         |            |               | 244/118.5 |
| 7,751,955 | B2 | * | 7/2010  | Chinnadurai | ...... | G05B 23/0235 |
|           |    |   |         |            |               | 701/29.3 |
| 2008/0314060 | A1 | * | 12/2008 | Parikh | .................... | B64D 13/00 |
|           |    |   |         |            |               | 62/241 |
| 2013/0325286 | A1 | * | 12/2013 | Lacaille | ............ | G05B 23/0221 |
|           |    |   |         |            |               | 701/99 |
| 2015/0251765 | A1 | * | 9/2015  | Jonqueres | .............. | B64D 13/08 |
|           |    |   |         |            |               | 62/86 |
| 2016/0107768 | A1 | * | 4/2016  | Nicks | .................... | B64F 5/0045 |
|           |    |   |         |            |               | 702/183 |

* cited by examiner

*Primary Examiner* — Francis Gray
(74) *Attorney, Agent, or Firm* — Patterson + Sheridan, LLP (57) ABSTRACT

Method and apparatus for determining a probability of below-specified performance of a low temperature limit control valve. During operation of an environmental control system (ECS) for a vehicle, current operation parameters related to the ECS are sensed. Historical operation parameters related to the ECS are retrieved. A probability of below-specified performance of the low temperature limit control valve is determined based on a predetermined relationship between the stored current operation parameters, the historical operation parameters, and the probability of below-specified performance of the low temperature limit valve.

20 Claims, 3 Drawing Sheets

METHOD AND SYSTEM FOR DIAGNOSES AND PROGNOSES OF LOW TEMPERATURE LIMIT CONTROL VALVE

BACKGROUND

Aspects described herein relate to an environmental control system (ECS) connected to a gas turbine engine, and more specifically, to a method and system for diagnosing and predicting performance below a specified performance level (i.e., below-specified performance) of a low temperature limit valve in an ECS.

SUMMARY

According to one aspect, a method includes sensing current operation parameters related to an environmental control system (ECS) during operation of the ECS for a vehicle. The method also includes retrieving historical operation parameters related to the ECS. The method also includes determining a probability of below-specified performance of a low temperature limit valve of the ECS, based on a predetermined relationship between the sensed current operation parameters and the probability of below-specified performance, wherein the predetermined relationship is based on the current operation parameters, the historical operation parameters, and the probability of below-specified performance of the low temperature limit valve.

According to one aspect, an environmental control system (ECS) for a vehicle that includes a first duct arranged to supply cold air from a cold air source. The ECS also includes a second duct arranged to supply warm air from a warm air source. The ECS also includes a junction where the first duct and the second duct intersect. The junction includes an output duct that outputs a mixture of the cold air and the warm air. The ECS also includes a low temperature limit valve arranged in the second duct. The low temperature limit valve is operable to control flow of the warm air from the warm air source. The ECS also includes a valve position sensor arranged relative to the low temperature limit valve. The valve position sensor is operable detect a position of the low temperature limit valve. The ECS also includes a first pressure sensor operable to detect an air pressure downstream of the low temperature limit valve. The ECS also includes a first temperature sensor operable to detect an air temperature downstream of the low temperature limit valve. The ECS also includes a valve controller operable to send valve position commands to the low temperature limit valve, based on the temperature detected by the first temperature sensor. The valve controller is also operable to sense current operation parameters related to the low temperature limit valve, wherein the current operation parameters include commanded positions of the low temperature limit valve, detected positions of the low temperature limit valve, and detected pressures detected by the first pressure sensor at different sample times.

According to one aspect, an aircraft includes an aircraft cabin adapted to be pressurized. The aircraft also includes a gas turbine engine. The gas turbine engine includes at least one engine bleed. The aircraft also includes an environmental control system (ECS) operable to receive bleed air from the at least one engine bleed and to provide conditioned air to the aircraft cabin. The ECS includes a first duct arranged to supply cold air from a cold air source. The ECS also includes a second duct arranged to supply warm air from a warm air source. The ECS also includes a junction where the first duct and the second duct intersect. The junction includes an output duct that outputs a mixture of the cold air and the warm air. The ECS also includes a low temperature limit valve arranged in the second duct. The low temperature limit valve is operable to control flow of the warm air from the warm air source. The ECS also includes a valve position sensor arranged relative to the low temperature limit valve. The valve position sensor is operable detect a position of the low temperature limit valve. The ECS also includes a first pressure sensor operable to detect an air pressure downstream of the low temperature limit valve. The ECS also includes a first temperature sensor operable to detect an air temperature downstream of the low temperature limit valve. The ECS also includes a valve controller operable to send valve position commands to the low temperature limit valve, based on a detected temperature of the mixture of the cold air and the warm air in the output duct of the junction. The valve controller is also operable to sense current operation parameters related to the low temperature limit valve, wherein the current operation parameters include commanded positions of the low temperature limit valve, detected positions of the low temperature limit valve, and detected pressures detected by the first pressure sensor at different sample times.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aircraft and other vehicles typically include an environmental control system (ECS) that provides a passenger compartment and/or other compartments (e.g., an electronics compartment or a cargo compartment) with temperature adjusted and/or de-humidified air. For pressurized aircraft, the ECS also provides pressurization to at least the passenger compartment. The pressurized air is provided by an engine bleed, wherein high-pressure air is removed from a compressor of the gas turbine engine. The air from the gas turbine engine is typically too hot to be provided directly to a passenger cabin. For example, the air from the engine bleed could be in excess of 300° F. Thus, a portion of the engine bleed air is diverted to a cooling system that cools the diverted air and also dehumidifiers the air using a water separator. The diverted cold air is then mixed with the remaining hot engine bleed air to provide air to the passenger cabin that is set at a suitable (e.g., comfortable) level. By adjusting a ratio of the diverted cold air to the remaining hot engine bleed air, the temperature of the air being provided to the cabin can be controlled and adjusted.

In certain circumstances (e.g., on cold days and/or at high altitudes), the cooling system could decrease the temperature of the diverted air to a temperature that is close to or below the freezing point of water (i.e., 32° F.). In such circumstances, water ice could build up in the water separator, degrading the performance of the water separator or causing the water separator to stop working. To prevent the diverted air from becoming too cold under such circumstances, the ECS includes a low temperature limit valve that can introduce some hot or warm air to the diverted cold air. The warmer air passing through the low temperature limit valve warms the cold diverted air such that water condensed out by the water separator will not freeze.

In various aspects, the low temperature limit valve is a butterfly valve that includes a movable valve flap. The movable valve flap can be operated to control the flow of the warmer air therethrough. The low temperature limit valve is a replaceable unit, and its performance can degrade over time. For example, residue from air passing through the low temperature limit valve could accumulate on the low temperature limit valve, preventing or inhibiting movement of the movable valve flap. As another example, the valve flap of the low temperature limit valve could become degraded (e.g., bent), preventing or inhibiting the valve flap from fully opening or closing or changing a flow characteristic through the valve. As another example, the valve flap could become corroded, preventing or inhibiting the valve flap from fully opening or closing or changing a flow characteristic through the valve. When performance of the low temperature limit valve degrades by a certain amount (i.e., below a specified performance level), the ECS may not control the temperature in the aircraft cabin (or other aircraft compartments) in a satisfactory manner. For example, the low temperature limit valve could allow too much warm air to pass their through, which could prevent the ECS from providing suitably cold air for the aircraft cabin. As another example, the low temperature limit valve may not provide sufficient warm air to prevent the water separator from freezing.

In various aspects described herein, operations data related to the ECS, both current and historical, is used to calculate a probability of below-specified performance of the low temperature limit valve. When the probability of below-specified performance passes a threshold probability level, the low temperature limit valve can be replaced. By replacing the valve after the probability of below-specified performance has passed the threshold probability level, the valve can be replaced prior to below-specified performance, but not so early that the valve is being prematurely replaced (e.g., in a wasteful manner).

Figure 1:
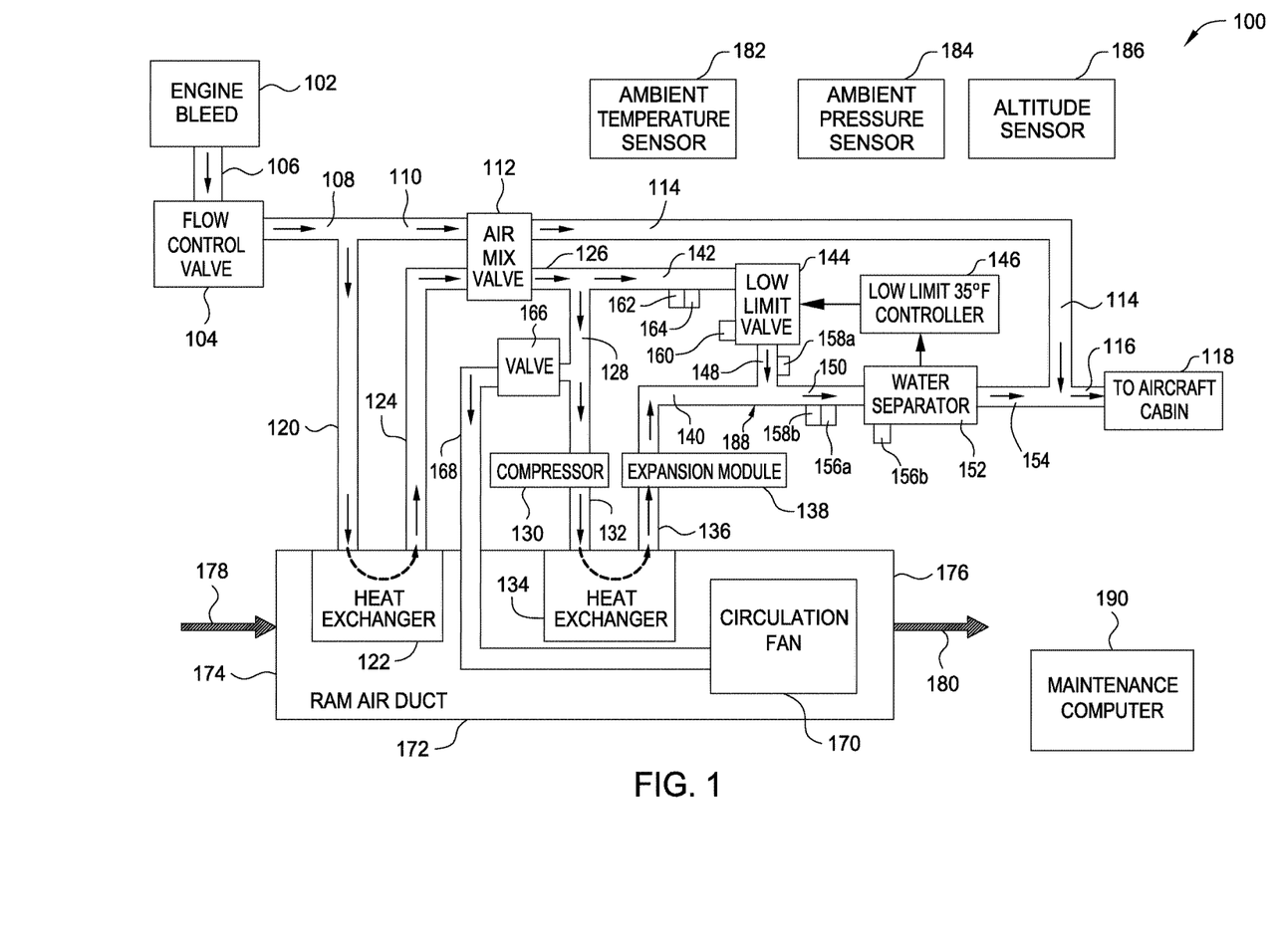
FIG. 1 is a schematic block diagram of an environmental control system (ECS) in an aircraft.

FIG. 1 is a block diagram of an environmental control system (ECS) 100 for an aircraft. The block diagram shows various components with air flow paths therebetween. In various aspects, the air flow paths are ducts that direct air from one component to another. In various other aspects, two components may be contained within a single module and the air flow path is an internal channel within the module. In the following discussion, the air flow paths are described as ducts, but refer to any type of passageway, channel, or other flow path that can direct the flow of air. The block diagram includes arrows in the depicted ducts to illustrate the direction of airflow.

The ECS 100 shown in FIG. 1 is arranged between an engine bleed 102 and an aircraft cabin 118. The engine bleed 102 can be an engine bleed on a gas turbine engine, an auxiliary power unit (APU), or an output of a turbocharger for a reciprocating engine, for example. Air from the engine bleed 102 flows through a duct 106 to a flow control valve 104. The flow control valve 104 is operable to adjust the flow rate of air that from the engine via the engine bleed 102. Air passing through the flow control valve 104 is output to a duct 108. The air from the engine bleed 102 and output from the duct 108 is hot. For example, the air output from the duct 108 could be 300° F. or hotter. As discussed above, the ECS 100 diverts a portion of the air from the duct 108 directly to the aircraft cabin 118 (via duct 110, an air mix valve 112, and ducts 114 and 116 leading to the aircraft cabin 118). Also, the ECS 100 diverts a remaining portion of the air from the duct 108 through a cooling system (beginning with duct 120), discussed in greater detail below, to reduce the temperature of the remaining portion of the air. The reduced temperature air is output from a duct 154 to mix with the hot air from the duct 114. The mixed cold air and hot air is provided to the aircraft cabin 118 via the duct 116. The air mix valve 112 adjusts the ratio of hot air (via duct 114) and cold air (via duct 154) to control the temperature of the air being provided to the aircraft cabin 118.

The ECS 100 includes a two-stage cooling arrangement. In the first stage, hot air output from the duct 108 travels into a duct 120. The duct 120 directs the air to a heat exchanger 122 in a ram air duct 172 of the aircraft. Typically, the ram air duct 172 is arranged on the bottom of the aircraft (e.g., in a wing-fuselage fairing) and includes an inlet 174 and the outlet 176. Air from the atmosphere flows into the ram air duct 172 through the inlet 174 (as indicated by arrow 178) and flows out of the ram air duct 172 via the outlet 176 (as indicated by arrow 180). Movement of the aircraft through the air (e.g., during flight and/or during high-speed taxi operations) may provide sufficient airflow through the ram air duct 172 for the heat exchanger 122 (and heat exchanger 134, discussed below) to operate effectively. At other times (e.g., when the aircraft is parked and/or taxiing slowly), a circulation fan 170 (discussed in greater detail below) is operated to drive airflow through the ram air duct 172. The air entering the heat exchanger 122 from the duct 120 is output to a duct 124. The heat exchanger 122 removes some of the heat from the air traveling through the heat exchanger 122 from the duct 120. The temperature of the air in the duct 124 depends on several factors, such as the outside air temperature, but may be between 40° F. and 200° F. The warm air from the duct 124 is referred to herein as a warm air source.

The air from the duct 124 (i.e., the warm air source) is directed to the air mix valve 112. The air mix valve 112 is a proportional valve, meaning that the air mix valve 112 operates between an end of a range where 100% of the hot air from the duct 110 passes to the duct 114 and 0% of the warm air from the duct 124 passes to a duct 126 and an opposite end of the range where 0% of the hot air from the duct 110 passes to the duct 114 and 100% of the warm air from the duct 124 passes to the duct 126. For example, in the middle of the range of the air mix valve 112, 50% of the hot air from the duct 110 passes to the duct 114 and 50% of the warm air from the duct 124 passes to the duct 126. As another example, at one position of the air mix valve 112, 25% of the hot air from the duct 110 passes to the duct 114 and 75% of the warm air from the duct 124 passes to the duct 126. As another example, at one position of the air mix valve 112, 75% of the hot air from the duct 110 passes to the duct 114 and 25% of the warm air from the duct 124 passes to the duct 126. In at least one aspect, the air mix valve 112 typically operates in positions between the middle of the range and the end of the range in which 100% of the warm air from the duct 124 passes to the duct 126.

After the warm air passes to the duct 126, a portion of the warm air from the duct 126 is directed to a duct 128 for the second cycle of the two-cycle cooling system. The warm air in the duct 128 is directed to a compressor 130, which raises the pressure and temperature of the air. The air from the compressor 130 passes through a duct 132 to the second heat exchanger 134 in the ram air duct 172. The second heat exchanger 134 decreases the temperature of the air from the duct 132. The cooled air from the second heat exchanger 134 then travels through a duct 136 to an air cycle machine 138. The air cycle machine 138 can be a turbine or other expander that reduces the pressure and temperature of the air. At the output of the air cycle machine 138, the air flowing into a duct 140 can be close to the freezing point of water. For example, the air flowing through the duct 140 could be in a range between 30° F. and 35° F. depending on the outside air temperature and the airflow through the ram air duct 172. The output from the air cycle machine 138 is referred to herein as a cold air source.

The duct 140 from the air cycle machine 138 directs the cold air to a junction 188. Air traveling from the duct 140 passes through the junction 188 to a duct 150 that leads to a water separator 152. The water separator 152 removes water from the air in the duct 150. In various aspects, the water separator 152 may circulate the air flowing therethrough. Water droplets, which are heavier than the air, are moved outwardly by the circular motion and thereby separated from the air. The cold air with moisture removed is output by the water separator 152 to the duct 154. The cold air from the duct 154 mixes with the hot air from the duct 114 to provide air at a suitable temperature for the aircraft cabin 118. Air reaches the aircraft cabin 118 via the duct 116 at a suitable temperature to provide controllable temperature regulation in the cabin.

Returning to the water separator 152, if the cold air from the air cycle machine 138 is too cold, the water droplets in the water separator 152 could freeze and form ice in the water separator 152. Such icing of the water separator 152 could render the water separator 152 inoperative and/or could block the flow of the cold air to the duct 154 that supplies the cold air to the aircraft cabin 118. The ECS includes a warm air path that supplies warm air to increase the temperature of the cold air from the air cycle machine 138 in the event that the cold air is too cold. Referring again to the duct 126 from the air mix valve 112, some of the warm air output by the air mix valve 112 is diverted to a duct 142 that leads to a low temperature limit valve 144. The low temperature limit valve 144 is operated by a low limit controller 146 that opens or closes the valve to control the temperature of the air in or reaching the water separator 152. In the ECS 100 shown in FIG. 1, the low limit controller 146 operates the valve to control the temperature of the air in or reaching the water separator 152 at or above a threshold temperature (e.g., a temperature of 35° F.). In various other aspects, the low limit controller 146 could control the temperature at or above a different temperature, such as above 32° F., for example. The ECS 100 includes a temperature sensor 156a that detects an air temperature in the duct 150 supplying cold air to the water separator 152 and/or a temperature sensor 156b that detects an air temperature in the water separator 152. The temperature sensors 156a and/or 156b are in communication with the low limit controller 146 and provide temperatures that the low limit controller 146 uses to control operation of the low temperature limit valve 144. For example, the low limit controller 146 may operate in a closed feedback loop based on the temperature detected by the temperature sensors 156a and/or 156b. In the event the temperature of the cold air from the air cycle machine 138 is below the threshold temperature (e.g., a threshold temperature of 35° F.), then the low limit controller 146 could at least partially open the low temperature limit valve 144 to add warm air from the duct 142 to the cold air from the duct 140 at the junction 188. The added warm air can increase the temperature of the air in the duct 150 such that water condensed out in the water separator 152 does not freeze.

As discussed above, the ram air duct 172 can include a circulation fan 170 that can force air through the ram air duct 172 in the event that movement of the aircraft through the atmosphere does not provide sufficient flow (e.g., when the aircraft is stationary on the ground). The circulation fan 170 can be driven by warm air from the duct 126 and the air mix valve 112. For example, in the ECS 100, a valve 166 that controls flow of warm air to the circulation fan 170 is in communication with the duct 128. When the valve 166 is open, warm air flows through a duct 168 to the circulation fan 170, thereby driving the circulation fan 170.

As discussed above, the low temperature limit valve 144 is a replaceable unit that can degrade and/or perform below a specified performance level over time. For example, impurities in the air could accumulate on the surfaces of the low temperature limit valve 144. The accumulated impurities could inhibit movement of the low temperature limit valve 144 or reduce the range of motion of the low temperature limit valve 144

The low limit controller 146 can receive data from sensors (in addition to the temperature sensors 156a and/or 156b) that can be used to predict below-specified performance of the low temperature limit valve 144. For example, the ECS 100 can include a valve position sensor 160 that reports a position of the low temperature limit valve 144. The ECS 100 can also include a pressure sensor 158a that detects air pressure in the duct 148 leading from the low temperature limit valve 144 and/or a pressure sensor 158b that detects air pressure in the duct 150 leading to the water separator 152. The ECS 100 can also include a temperature sensor 162 that detects air temperature in the duct 142 leading to the low temperature limit valve 144. The ECS 100 can also include a temperature sensor 164 that detects air temperature in the duct 142 leading to the low temperature limit valve 144. Above-mentioned sensors 156a, 156b, 158a, 158b, 162, and 164 can transmit the pressures and temperatures, respectively, to the low limit controller 146. The valve position sensor 160 can transmit the valve position to the low limit controller 146. The low limit controller 146 can also receive environmental data related to the aircraft and the ECS 100. For example, the low limit controller 146 could receive an ambient temperature (e.g., an outside air temperature) from an ambient temperature sensor 182 associated with avionics for the aircraft. As another example, the low limit controller 146 could receive an ambient pressure (e.g., an outside air pressure) from an ambient pressure sensor 184 associated with avionics for the aircraft. As another example, the low limit controller 146 could receive altitude information from an altitude sensor 186 associated with avionics for the aircraft. In various aspects, the low limit controller 146 could periodically (e.g., once per second, once per minute, once every fifteen minutes, once per hour, once per flight) obtain data from various sensors and record it. For example, the low limit controller 146 could include or be in communication with a memory storage device (e.g., a hard drive, a solid state drive, or a like device) onto which the obtained data from the various sensors is recorded.

As discussed in greater detail below with reference to FIGS. 2A and 2B, in various aspects, the low limit controller 146 could use the recorded data to determine a predefined relationship between a probability of below-specified performance of the low temperature limit valve 144 and historical ECS operation parameter data recorded by the sensors. The low limit controller 146 could then apply the predefined relationship to current ECS operation parameter data recorded by the sensors to calculate a current probability of below-specified performance of the low temperature limit valve 144. In the event the probability of below-specified performance of the low temperature limit valve 144 exceeds a threshold probability, then the low limit controller 146 could output a flag (e.g., to a maintenance screen of the avionics of the aircraft) that would prompt an operator of the aircraft to replace the low temperature limit valve 144. In various other aspects, the low limit controller 146 could transmit the recorded data to another computer, such as a maintenance computer 190. The maintenance computer 190 could gather the historical ECS operation parameter data recorded by the sensors for the aircraft (and, optionally, other similar aircraft) and could determine the predefined relationship between the historical ECS operation parameter data and the probability of below-specified performance of the low temperature limit valve 144. The maintenance computer 190 could then periodically receive current ECS operation parameter data from the low limit controller 146 and calculate a probability of below-specified performance of the low temperature limit valve by applying the determined predefined relationship to the current ECS operation parameter data. Alternatively, the maintenance computer 190 could transmit the determined predefined relationship to the low limit controller 146, and the low limit controller 146 can calculate the probability of below-specified performance of the low temperature limit valve 144 by applying the determined predefined relationship to the current ECS operation parameter data.

Figure 2A:
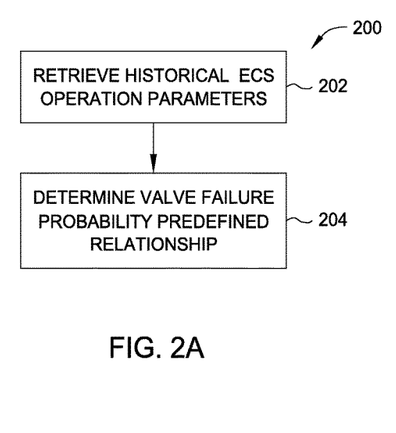
FIG. 2A is a flow chart illustrating a method according to one aspect for determining a predetermined relationship between historical ECS operation parameters and a probability that a low temperature limit valve will perform below a specified performance level.
Figure 2B:
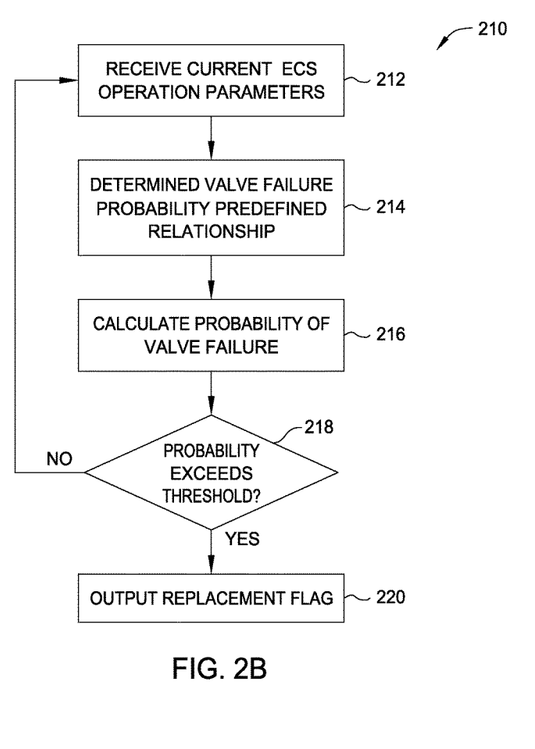
FIG. 2B is a flow chart illustrating a method according to one aspect for calculating the probability of performance below a specified performance level (i.e., below-specified performance) of the low temperature limit valve based on current operation parameters related to the ECS and the relationship predetermined relationship determined by the method of FIG. 2A.

Referring now to FIG. 2A, the method 200 for determining a predefined relationship between a probability of below-specified performance of a low temperature limit control valve (e.g., the low temperature limit valve 144 of the ECS 100 shown in FIG. 1) can be determined by retrieving historical operation parameters related to the ECS in block 202. For example, historical operation parameters related to the ECS from sensors (e.g., the pressure, temperature, valve position, and altitude sensors discussed above with reference to FIG. 1) can be gathered for different time points and/or from different aircraft. In block 204, the historical operation parameters related to the ECS can be compared to known conditions of low temperature limit valves and/or historical operation parameters related to the ECS at the time of below-specified performance of low temperature limit valves to determine a predefined relationship between the probability of below-specified performance of a low temperature limit valve and ECS operation parameters. The predefined relationship could be determined using one of several known mathematical operations. For example, the predefined relationship could be determined using a linear regression analysis, a nonlinear regression analysis, a machine learning algorithm, or the like.

After the predefined relationship between the probability of below-specified performance of a low temperature limit valve and ECS operation parameters has been determined, the predefined relationship can be used to predict future below-specified performance of low temperature limit valves. FIG. 2B illustrates a method 210 for predicting below-specified performance of low temperature limit valves. In block 212 of the method 210, current operation parameters related to the ECS are received (e.g. by the low limit controller 146 shown in FIG. 1). In block 214, the received current operation parameters related to the ECS are applied to the determined predefined relationship to calculate the probability of below-specified performance of the low temperature limit valve in block 216. In block 218, if the calculated probability exceeds a threshold probability (e.g., 1% probability, 5% probability, 10% probability, or 50% probability), then a replacement flag or other indication is output in block 220. As discussed above, the low limit controller 146 of the ECS 100 shown in FIG. 1 can output a flag that results in a maintenance message being displayed on avionics in the cockpit of the aircraft. Still referring to block 218, if the calculated probability does not exceed the threshold, then the method returns to block 212 to receive a next set of current operation parameters related to the ECS. The low limit controller 146 could continuously or periodically receive current operation parameters related to the ECS. For example, the low limit controller 146 could receive current operation parameters related to the ECS once per second, once per minute, once per hour, once per flight, etc.

Figure 3:
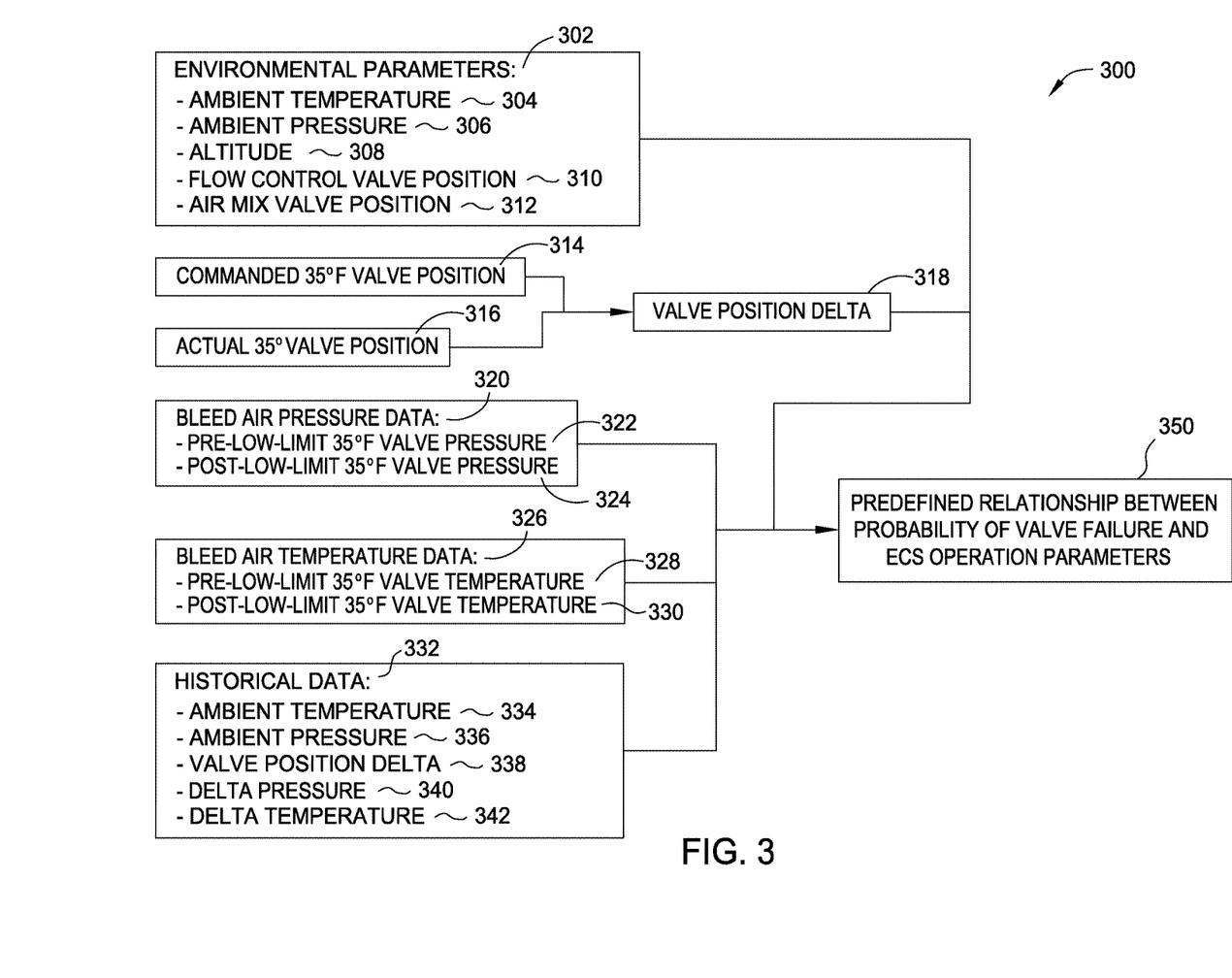
FIG. 3 is a block diagram illustrating data that could be used, according to at least one aspect, to determine the relationship between the current operation parameters related to the ECS, historical operation parameters related to the ECS, and a probability that a low temperature limit valve will perform below a specified performance level.

FIG. 3 illustrates various ECS operation parameters 300 that could be used, according to one aspect, to determine the predefined relationship between the probability of below-specified performance of the low temperature limit valve and ECS operation parameters. The ECS operation parameters 300 include environmental parameters 302. The environmental parameters 302 include ambient temperature 304 (e.g., from the ambient temperature sensor 182), ambient pressure 306 (e.g., from the ambient pressure sensor 184, and an altitude 308 (e.g., from the altitude sensor 186). As discussed above, the ambient temperature 304, the ambient pressure 306, and the altitude 308 could affect the effectiveness and/or the efficiency of heat exchangers 122 and 134 in the ram air duct 172 of the ECS 100 shown in FIG. 1. Thus, the ambient temperature 304, the ambient pressure 306, and the altitude 308 could affect the temperature of the cold air output by the air cycle machine 138. The environmental parameters 302 could also include a flow control valve position 310 (e.g., a position of the flow control valve 104). The position of the flow control valve 104 affects the total flow of air from the engine bleed 102 through the ECS 100. In various aspects, the ECS 100, and in particular the heat exchangers 122 and 134, could operate most efficiently at a particular flow rate, which is affected by the position of the flow control valve 104. The environmental parameters 302 could also include an air mix valve position 312. Again, in various aspects, the heat exchangers 122 and 134 could operate most efficiently at a particular flow rate, which is affected by the position of the air mix valve 112.

The ECS operation parameters 300 can also include a commanded position of the low temperature limit valve 144 (e.g., a position commanded by the low limit controller 146) and an actual position of the low temperature limit valve 144 (e.g., a position detected by the valve position sensor 160). A difference between the commanded position and the actual position of the low temperature limit valve 144 can result in a valve position delta 318 (i.e., a valve position difference). The valve position delta 318 could identify impending below-specified performance caused by movement of the low temperature limit valve 144. For example, as discussed above, impurities may build up on the valve components, causing the valve to stick or to limit movement of the valve. The valve position delta 318 could identify such issues.

The ECS operation parameters 300 can also include bleed air pressure data 320. The bleed air pressure data 320 can include an air pressure upstream of the low temperature limit valve 144 (e.g., an air pressure detected by the pressure sensor 162) and can include an air pressure downstream of the low temperature limit valve 144 (e.g., an air pressure detected by the pressure sensor 158*a* and/or the pressure sensor 158*b*). The bleed air pressure data 320 could identify impending below-specified performance of the low temperature limit valve 144 that could result in a larger pressure drop or a smaller pressure drop across the low temperature limit valve 144 for a given valve position. Additionally, the bleed air pressure data 320 can confirm the valve position data for the actual valve position 316. For example, if the low temperature limit valve 144 is fully open, then the pressure drop across the low temperature limit valve 144 should be relatively small.

The ECS operation parameters 300 can also include bleed air temperature data 326. The bleed air temperature data 326 can include an air temperature upstream of the low temperature limit valve 144 (e.g., an air temperature detected by the temperature sensor 164) and can include an air temperature downstream of the low temperature limit valve 144 (e.g., an air temperature detected by the temperature sensor 156*a* and/or the temperature sensor 156*b*). The bleed air temperature data 326 could identify impending below-specified performance of the low temperature limit valve 144 that could result in a larger temperature drop or a smaller temperature drop across the low temperature limit valve 144 for a given valve position. Additionally, the bleed air temperature data 326 can confirm the valve position data for the actual valve position 316. For example, if the low temperature limit valve 144 is fully open, then the temperature drop across the low temperature limit valve 144 should be relatively small.

The ECS operation parameters 300 can also include historical data 332. The historical data can include historical ambient temperatures 334, historical ambient pressure's 336, historical valve position delta's 338, historical pressure delta's 340, and historical temperature deltas 342. The historical data 332 could identify trends or step changes over time that could indicate impending below-specified performance of the low temperature limit valve 144 or actual below-specified performance of low temperature limit valve 144. The ECS operation parameters 300 are used to determine a predefined relationship between a probability of below-specified performance of the low temperature limit valve and the ECS operation parameters 350. As discussed above, in various aspects, linear regression analysis, non-linear regression analysis, machine learning, or other mathematical best fit algorithms could be applied to the ECS operation parameters 300 to determine the predefined relationship.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of aspects described herein, a user may access applications (e.g., probability of below-specified performance applications) that operate or related data available in the cloud. For example, a probability of below-specified performance calculator application that operates on the determined relationship between the probability of below-specified performance of the low temperature limit valve and the various parameters could execute on a computing system in the cloud and calculate a probability of below-specified performance of a particular low temperature limit valve. In such a case, the probability of below-specified performance calculator application could calculate a probability of below-specified performance of a particular low temperature limit valve and store the calculate probability at a storage location in the cloud. Doing so allows a user to access this information from any computing system attached to a network connected to the cloud (e.g., the Internet).

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. A method, comprising:
    during operation of an environmental control system (ECS) for a vehicle, sensing current operation parameters related to the ECS;
    retrieving historical operation parameters related to the ECS; and
    determining a probability of below-specified performance of a low temperature limit valve of the ECS, based on a predetermined relationship between the sensed current operation parameters and the probability of below-specified performance, wherein the predetermined relationship is based on the current operation parameters, the historical operation parameters, and the probability of below-specified performance of the low temperature limit valve.

2. The method of claim 1, further comprising:
calculating the predetermined relationship between the sensed current operation parameters, the historical operation parameters, and the probability of below-specified performance of the low temperature limit valve.

3. The method of claim 1, wherein the current operation parameters include a current commanded position of the low temperature limit valve and a detected position of the low temperature limit valve.

4. The method of claim 1, wherein the current operation parameters include a pressure at a location upstream of the low temperature limit valve and a pressure at a location downstream of the low temperature limit valve.

5. The method of claim 1, wherein the current operation parameters include a temperature at a location upstream of the low temperature limit valve and a temperature at a location downstream of the low temperature limit valve.

6. The method of claim 1, wherein the current operation parameters include at least one of: an ambient pressure, an ambient temperature, an altitude, and a position of a flow control valve for the ECS.

7. The method of claim 1, wherein the historical operation parameters include at least one of: historical ambient pressures, historical ambient temperatures, historical altitudes, and positions of a flow control valve for the ECS at different time samples.

8. An environmental control system (ECS) for a vehicle, comprising:
a first duct arranged to supply cold air from a cold air source;
a second duct arranged to supply warm air from a warm air source;
a junction where the first duct and the second duct intersect, wherein the junction includes an output duct that outputs a mixture of the cold air and the warm air;
a low temperature limit valve arranged in the second duct, wherein the low temperature limit valve is operable to control flow of the warm air from the warm air source;
a valve position sensor arranged relative to the low temperature limit valve, wherein the valve position sensor is operable detect a position of the low temperature limit valve;
a first pressure sensor operable to detect an air pressure downstream of the low temperature limit valve;
a first temperature sensor operable to detect an air temperature downstream of the low temperature limit valve; and
a valve controller operable to:
send valve position commands to the low temperature limit valve, based on the temperature detected by the first temperature sensor; and
sense current operation parameters related to the low temperature limit valve, wherein the current operation parameters include commanded positions of the low temperature limit valve, detected positions of the low temperature limit valve, and detected pressures detected by the first pressure sensor at different sample times.

9. The ECS of claim 8, wherein the valve controller is further operable to perform diagnostics on the low temperature limit valve by:
retrieving historical operation parameters related to the ECS; and
determining a probability of below-specified performance of the low temperature limit valve, based on a predetermined relationship between the sensed current operation parameters and the probability of below-specified performance, wherein the predetermined relationship is based on the current operation parameters, the historical operation parameters, and the probability of below-specified performance of the low temperature limit valve.

10. The ECS of claim 9, wherein the valve controller is further operable to calculate the predetermined relationship between the sensed current operation parameters, the historical operation parameters, and the probability of below-specified performance of the low temperature limit valve.

11. The ECS of claim 8, further comprising a maintenance computer, wherein the valve controller is operable to output the sensed current operation parameters to the maintenance computer, and wherein the maintenance computer is operable to perform diagnostics on the low temperature limit valve by:
retrieving historical operation parameters related to the ECS; and
determining a probability of below-specified performance of the low temperature limit valve, based on a predetermined relationship between the sensed current operation parameters, the historical operation parameters, and the probability of below-specified performance of the low temperature limit valve.

12. The ECS of claim 11, wherein the maintenance computer is further operable to calculate the predetermined relationship between the sensed current operation parameters, the historical operation parameters, and the probability of below-specified performance of the low temperature limit valve.

13. The ECS of claim 8, further comprising a second pressure sensor operable to detect an air pressure upstream of the low temperature limit valve, and wherein the current operation parameters include pressures detected by the second pressure sensor at the different time samples.

14. The ECS of claim 8, further comprising a second temperature sensor operable to detect an air temperature upstream of the low temperature limit valve, and wherein the current operation parameters include temperatures detected by the first temperature sensor and temperatures detected by the second temperature sensor at the different time samples.

15. An aircraft, comprising:
an aircraft cabin adapted to be pressurized;
a gas turbine engine, wherein the gas turbine engine includes at least one engine bleed;
an environmental control system (ECS) operable to receive bleed air from the at least one engine bleed and to provide conditioned air to the aircraft cabin, the ECS including:
a first duct arranged to supply cold air from a cold air source;
a second duct arranged to supply warm air from a warm air source;
a junction where the first duct and the second duct intersect, wherein the junction includes an output duct that outputs a mixture of the cold air and the warm air;

a low temperature limit valve arranged in the second duct, wherein the low temperature limit valve is operable to control flow of the warm air from the warm air source;

a valve position sensor arranged relative to the low temperature limit valve, wherein the valve position sensor is operable detect a position of the low temperature limit valve;

a first pressure sensor operable to detect an air pressure downstream of the low temperature limit valve;

a first temperature sensor operable to detect an air temperature downstream of the low temperature limit valve; and a valve controller operable to:
  send valve position commands to the low temperature limit valve, based on a detected temperature of the mixture of the cold air and the warm air in the output duct of the junction; and
  sense current operation parameters related to the low temperature limit valve, wherein the current operation parameters include commanded positions of the low temperature limit valve, detected positions of the low temperature limit valve, and detected pressures detected by the first pressure sensor at different sample times.

16. The aircraft of claim 15, wherein the valve controller is further operable to perform diagnostics on the low temperature limit valve by:
  retrieving historical operation parameters related to the ECS; and
  determining a probability of below-specified performance of the low temperature limit valve, based on a predetermined relationship between the sensed current operation parameters and the probability of below-specified performance, wherein the predetermined relationship is based on the current operation parameters, the historical operation parameters, and the probability of below-specified performance of the low temperature limit valve.

17. The aircraft of claim 15, further comprising a ram air duct, wherein the ram air duct includes a first heat exchanger arranged therein, wherein the warm air source comprises air flow from the at least one engine bleed that passes through the first heat exchanger, wherein the ram air duct includes a second heat exchanger arranged therein, and wherein the cold air source comprises air flow from the warm air source that passes through a compressor, the second heat exchanger, and an air cycle machine.

18. The aircraft of claim 15, wherein the ECS further comprises a flow control valve downstream of the at least one engine bleed, and wherein the current operation parameters include a position of the flow control valve.

19. The aircraft of claim 15, wherein the ECS further comprises a water separator in fluid communication with the output duct of the junction, wherein the first temperature sensor is operable to detect one of: a temperature of air in the output duct and a temperature of air in the water separator, and wherein the valve controller sends valve position commands to the low temperature limit valve to achieve a detected temperature from the first temperature sensor above a threshold temperature.

20. The aircraft of claim 19, wherein the threshold temperature is 35° F.

* * * * *

UNITED STATES PATENT AND TRADEMARK OFFICE
CERTIFICATE OF CORRECTION

PATENT NO. : 9,784,638 B1
APPLICATION NO. : 14/841219
DATED : October 10, 2017
INVENTOR(S) : David Allan Followell et al.

Page 1 of 1

It is certified that error appears in the above-identified patent and that said Letters Patent is hereby corrected as shown below:

In the Claims

In Column 13, Line 50, in Claim 8, delete "operable detect" and insert -- operable to detect --, therefor.

In Column 15, Line 7, in Claim 15, delete "operable detect" and insert -- operable to detect --, therefor.

Signed and Sealed this
Twentieth Day of February, 2018

Andrei Iancu
*Director of the United States Patent and Trademark Office*